No. 678,270. Patented July 9, 1901.
D. H. MOWEN.
BROOM HOLDER.
(Application filed Apr. 26, 1901.)

(No Model.)

WITNESSES:
Fred P. Bradford.
Perry B. Turpin.

INVENTOR
D. H. Mowen.
BY Munn & Co.
ATTORNEYS

United States Patent Office.

DANIEL H. MOWEN, OF MYERSVILLE, MARYLAND.

BROOM-HOLDER.

SPECIFICATION forming part of Letters Patent No. 678,270, dated July 9, 1901.

Application filed April 26, 1901. Serial No. 57,586. (No model.)

*To all whom it may concern:*

Be it known that I, DANIEL H. MOWEN, residing at Myersville, in the county of Frederick and State of Maryland, have invented a new and useful Improvement in Broom-Holders, of which the following is a specification.

My invention is an improvement in broom-holders, and has for an object to provide a simple novel construction for holding the broom in which the clamping-arms will stand at an angle to the carrier or base, in which the clamp will include a sliding member which will be operated by the gravity of the broom-handle and of the clamp, and in which the sliding clamping member will be constructed to provide a stop for limiting the dropping movement of the clamping devices.

My invention consists in certain novel constructions and combinations of parts, as will be hereinafter described and claimed.

Figure 1:
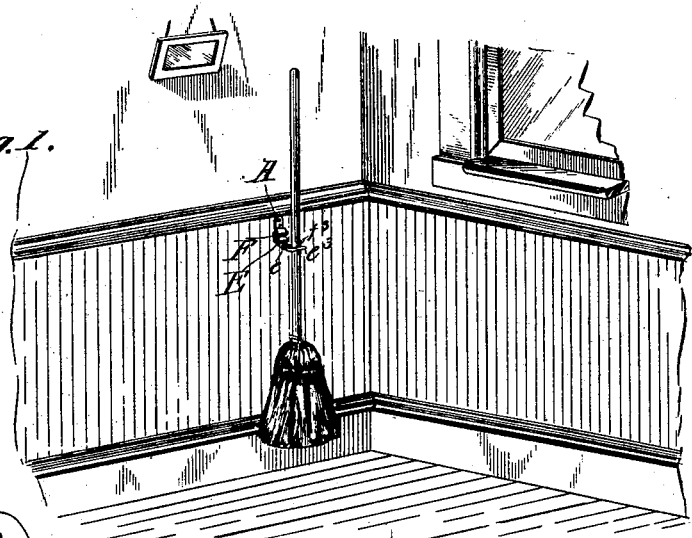
Figure 2:
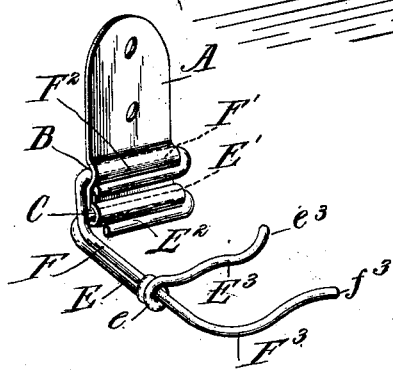
Figure 3:
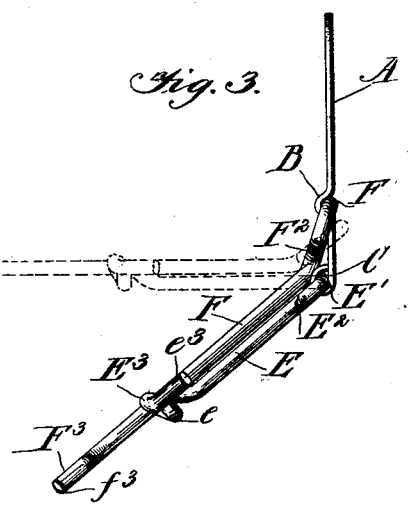

In the drawings, Figure 1 is a perspective view of my invention as in use. Fig. 2 is a detail perspective view of the holder with the broom-handle removed. Fig. 3 is a side view of the holder with the clamping devices lowered in full lines and raised in dotted lines, showing the spreading of the clamp for the broom-handle; and Fig. 4 is a detail view of the carrier.

Figure 4:
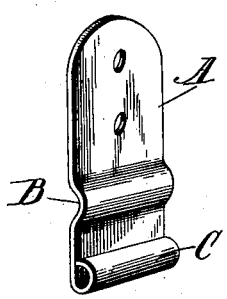

In carrying out my invention I provide a suitable carrier, which is shown in detail in Fig. 4 and consists, preferably, of a plate A, which may be conveniently secured against a wall or other support, as will be understood from Fig. 1, and is provided with an upper and a lower bearing B and C. The upper bearing B may be simply a groove or channel in the rear face of the plate, as there is no end thrust rearwardly on the sliding member of the clamp; but the bearing C is preferably closed on both its front and rear sides, as shown, as the main member of the clamp has a thrust in both directions.

It will be noticed that the clamp of my holder is inclined downwardly from its connection with the main plate. The clamping devices include clamping-bars E and F, which are slidable one upon the other and are pivoted, respectively, in the lower and upper bearings of the carrier-plate by means of shafts $E'$ and $F'$, from which extend returned portions $E^2$ and $F^2$, which construction operates to retain the members in connection with the carrier-plate, and the returned portion $F^2$ operates by engagement with the carrier-plate as a stop to limit the downward movement of the clamping devices. The section F slides through a loop $e$, formed by bending the section E, and the clamping-arms $E^3$ and $F^3$ are arranged to bind on opposite sides of the broom-handle and are spread slightly at $e^3$ and $f^3$ to facilitate the introduction of such handle between them.

In the operation of the described construction if the clamping devices be in the position shown in full lines, Fig. 3, and the broom-handle be forced laterally between the clamping-arms such operation will cause the clamping devices to rise slightly on their pivotal connection with the main plate as the arms are spread to receive the broom-handle, and when the said handle is released its gravity and that of the clamping devices will cause the arms of the clamp to tightly clasp and hold the handle as desired. It will be noticed that the clamp readily adjusts itself to different sizes of handles and by standing at an incline to the carrier-plate serves to hold the handle away from the wall, so it can be readily inserted in and removed from the clamp.

Having thus described my invention, what I claim, and desire to secure by Letters Patent, is—

1. The herein-described broom-holder consisting of the carrier-plate provided with the bearings arranged one above the other, the clamping-bar provided at its outer end with the clamping-arm and at its inner end with a shaft journaled in the lower bearing of the carrier-plate, said bar being provided with a guide-opening for the other clamping-bar, and the second clamping-bar slidable in said opening, provided at its outer end with an arm coöperating with that of the other bar and provided at its inner end with the shaft journaled in the upper bearing of the carrier-plate and having a returned portion extending across the face of the carrier and adapted to form a stop, substantially as set forth.

2. A broom-holder comprising two clamping-bars slidable one upon the other and provided at their outer ends with arms to clamp on opposite sides of the handle and pivotally supported at their inner ends, substantially as set forth.

3. A broom-holder comprising two clamping-sections slidable one upon the other and pivotally supported on different centers whereby as they are rocked upon their pivots they will be caused to approach and recede at their outer ends substantially as set forth.

4. A broom-holder comprising a clamp consisting of two members slidable relatively to each other and arranged to bind the broom-handle when the gravity thereof is exerted upon the said clamp, substantially as set forth.

5. A broom-holder comprising a carrier-plate, and clamping-sections having clamping-arms at their outer ends, slidable upon each other and having their inner ends pivoted to the carrier-plate one above the other, substantially as set forth.

6. A broom-holder consisting of the carrier-plate having bearings one above the other and the clamp composed of members provided at their inner ends with shafts journaled in the bearings of the carrier-plate, one of the members having a twisted portion forming a loop through which the other member may slide substantially as set forth.

7. The combination in a broom-holder of the carrier, and the clamp composed of members pivoted at their inner ends to the carrier-plate and slidable one along the other, one of the members being provided adjacent to its pivot with a returned portion arranged to abut the plate and operate as a stop substantially as set forth.

DANIEL H. MOWEN.

Witnesses:
SOLON C. KEMON,
PERRY B. TURPIN.